(12) United States Patent
Taniguchi et al.

(10) Patent No.: US 10,439,542 B2
(45) Date of Patent: Oct. 8, 2019

(54) ELECTRIC POWER CONVERSION DEVICE

(71) Applicant: DAIKIN INDUSTRIES, LTD., Osaka-shi, Osaka (JP)

(72) Inventors: Tomoisa Taniguchi, Osaka (JP); Morimitsu Sekimoto, Osaka (JP); Yasutaka Taguchi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/509,291

(22) PCT Filed: Sep. 30, 2015

(86) PCT No.: PCT/JP2015/004981
§ 371 (c)(1),
(2) Date: Mar. 7, 2017

(87) PCT Pub. No.: WO2016/051797
PCT Pub. Date: Apr. 7, 2016

(65) Prior Publication Data
US 2017/0279398 A1 Sep. 28, 2017

(30) Foreign Application Priority Data
Sep. 30, 2014 (JP) ................. 2014-201169

(51) Int. Cl.
*H02P 27/08* (2006.01)
*H02M 7/5395* (2006.01)
(Continued)

(52) U.S. Cl.
CPC .......... *H02P 27/08* (2013.01); *H02M 1/4225* (2013.01); *H02M 7/06* (2013.01); *H02M 7/12* (2013.01);
(Continued)

(58) Field of Classification Search
CPC ........ H02P 27/08; H02M 7/06; H02M 7/5395
USPC ......................................................... 318/722
See application file for complete search history.

(56) References Cited

U.S. PATENT DOCUMENTS

2015/0244287 A1* 8/2015 Narita ............... H02M 7/53871
363/124
2015/0303855 A1* 10/2015 Verhulst .................. H02P 23/04
62/611

FOREIGN PATENT DOCUMENTS

CN 1549439 A 11/2004
CN 101174794 A 5/2008
(Continued)

OTHER PUBLICATIONS

International Search Report, issued in PCT/JP2015/004981 (PCT/ISA/210), dated Dec. 22, 2015.
(Continued)

*Primary Examiner* — Kawing Chan
*Assistant Examiner* — Bradley R Brown
(74) *Attorney, Agent, or Firm* — Birch, Stewart, Kolasch & Birch, LLP (57) ABSTRACT

An electric power conversion device includes: a converter circuit which includes a boost chopper; a capacitor which is connected between output terminals of the converter circuit; a boost chopper which boosts a terminal voltage of the capacitor; a multiphase inverter circuit; and a boost chopper controller. In a case where the operation of the boost chopper is continuously stopped, the capacitor has a capacitance allowing the terminal voltage of the capacitor to have a pulse frequency twice as high as that of the AC power source. The multiphase inverter circuit has an output power which is allowed to fluctuate in synchronization with a power source.

20 Claims, 7 Drawing Sheets

(51) Int. Cl.
*H02M 7/06* (2006.01)
*H02M 7/12* (2006.01)
*H02M 7/48* (2007.01)
*H02M 1/42* (2007.01)
*H02M 7/5387* (2007.01)
*H02M 1/00* (2006.01)

(52) U.S. Cl.
CPC ........... *H02M 7/48* (2013.01); *H02M 7/5395* (2013.01); *H02M 7/53875* (2013.01); *H02M 2001/007* (2013.01); *Y02B 70/126* (2013.01)

(56) References Cited

FOREIGN PATENT DOCUMENTS

| | | |
|---|---|---|
| EP | 0 586 885 A1 | 3/1994 |
| EP | 1 496 605 A1 | 1/2005 |
| EP | 1 919 064 A2 | 5/2008 |
| JP | 4-207971 A | 7/1992 |
| JP | 2002-51589 A | 2/2002 |
| JP | 2004-88859 A | 3/2004 |
| JP | 2007-274818 A | 10/2007 |
| JP | 2011-155767 A | 8/2011 |
| JP | 2011-193678 A | 9/2011 |
| JP | 2011193678 A * | 9/2011 |
| JP | 2013-225998 A | 10/2013 |
| JP | 2013225998 A * | 10/2013 |

OTHER PUBLICATIONS

Extended European Search Report issued in corresponding European Application No. 15847982.4 dated Feb. 13, 2018.

* cited by examiner

ELECTRIC POWER CONVERSION DEVICE

TECHNICAL FIELD

The present invention relates to an electric power conversion device.

BACKGROUND ART

In electric power conversion devices, it is common practice to employ a full-wave diode-bridge rectifier circuit as a converter circuit to convert AC power into DC power, which is then input into an inverter circuit. Oftentimes, a large smoothing capacitor, such as an electrolytic capacitor, is installed between the converter circuit and the inverter circuit in order to supply a DC with a weak pulse to the inverter circuit.

In the above converter circuit, a rectifier diode conducts current only in a period when an absolute value of an input voltage is higher than a voltage of the smoothing capacitor. Therefore, the waveform of the input current of the converter circuit develops spikes, which negatively affects the power factor and results in the current including a harmonic component.

Moreover, an input reactor is employed in electric power conversion devices. However, since a high inductance is required to obtain an appropriate power factor and appropriate harmonics of a power source, components of the electric power conversion device need to be increased in volume and weight.

As a countermeasure, it has been attempted to improve the power factor and to reduce the harmonics in an electric power conversion device by boosting an AC, which is input into a diode bridge circuit (see, e.g., Patent Document 1). In Patent Document 1, a diode bridge circuit, which is supplied with an AC via a reactor, is provided. Apart from that, a power factor correction circuit is provided between all phase output terminals of the reactor and a negative terminal of the diode bridge circuit. The power factor correction circuit includes a switching element, which switches the reactor between energy storage and energy discharge. In a power factor correction circuit employing such a boost circuit, a small reactor can be employed since an inductance of the reactor can be kept relatively low.

In a different example, a conduction width of a diode bridge circuit is widened and a power factor is corrected by providing a DC link section, which is located between a converter circuit and an inverter circuit, with a capacitor of a relatively small capacitance (see, e.g., Patent Document 2).

CITATION LIST

Patent Documents

1. Japanese Unexamined Patent Publication No. 2007-274818
2. Japanese Unexamined Patent Publication No. 2002-51589

SUMMARY OF THE INVENTION

Technical Problem

To drive a motor by the electric power conversion device of Patent Document 2, power consumption is required as power is supplied to the motor and torque is generated in the motor during a period where the conduction width is wide. In this case, when the voltage of the AC power source is around a zero-crossing point, the correlation between an inductive voltage of the motor and an input voltage of the inverter circuit makes it difficult for a current to flow to the motor. In such a case, it is therefore common practice to drive the motor through so-called flux-weakening control.

However, the flux-weakening control involves the flow of a current (negative d-axis current) which does not contribute to the generation of torque. This decreases the efficiency of the motor and the inverter. Relatively small electric power conversion devices have a weak power source current and weak power source harmonics. Thus, a small conduction width is sufficient to achieve an appropriate harmonic control, the current does not increase much due to the flux-weakening control, and the efficiency is little affected. Electric power conversion devices of a high capacitance, however, feature strong harmonics. Thus, it becomes necessary to widen the conduction width to achieve an appropriate harmonic control, the current is significantly increased due to the flux-weakening control, and the efficiency is significantly affected. Moreover, if the current in the motor increases due to the flux-weakening control, it becomes necessary to increase the current capacitance of components of the inverter, which results in increased costs.

In view of the foregoing problem, the present invention attempts to improve the efficiency of an electric power conversion device and a motor.

Solution to the Problem

To solve the above problem, a first aspect relates to an electric power conversion device including:

a converter circuit (11), which is connected to an AC power source (30) and includes a boost chopper (15);

a capacitor (12a), which is connected between output terminals of the converter circuit (11);

a multiphase inverter circuit (13), which converts a terminal voltage (vdc) of the capacitor (12a) into an AC and supplies power to a motor (20); and a boost chopper controller (16), which controls operation of the boost chopper (15), wherein the capacitor (12a) has a capacitance allowing the terminal voltage (vdc) of the capacitor (12a) to have a pulse frequency twice as high as a frequency of the AC power source (30) when the operation of the boost chopper (15) is continuously stopped, and the multiphase inverter circuit (13) has an output power which is allowed to fluctuate in synchronization with a power source.

In this configuration, by increasing the terminal voltage (vdc), the motor is able to output a torque without the current being significantly increased due to flux-weakening control. Moreover, a conduction period where the converter circuit (11) conducts current can be extended by supplying power to the motor even near a zero-crossing point of a voltage of the AC power source.

Further, in a second aspect, which is an embodiment of the first aspect, the boost chopper controller (16) may boost a lower limit of the terminal voltage (vdc) of the capacitor (12a) to a value equal to or higher than a predetermined target value.

In this configuration, by boosting the lower limit of the terminal voltage (vdc) (also referred to as capacitor voltage (vdc)) to a value equal to or higher than the predetermined target value, the current occurring due to the flux-weakening control can be reduced significantly even if the capacitor voltage (vdc) is at the lower limit, and the motor (20) can output torque efficiently.

Further, in a third aspect, which is an embodiment of the first or second aspect, the boost chopper controller (16) may provide the boost chopper (15) with an operating period and an idle period in each half cycle of a voltage (vs) of the AC power source (30), and may control the boost chopper (15) such that a minimum value of an absolute value of the voltage of the AC power source (30) in the operating period of the boost chopper (15) is lower than a maximum value of an absolute value of the voltage of the AC power source (30) in the idle period of the boost chopper (15).

In this configuration, a switching element (15a) only operates when the absolute value of the voltage of the AC power source is relatively low.

Further, in a fourth aspect, which is an embodiment of the second aspect, the boost chopper controller (16) may boost the target value when an inductive voltage of the motor (20) has increased.

In this configuration, the lower limit of the capacitor voltage (vdc) is altered based on the inductive voltage. Therefore, even in a case where the absolute value of the voltage (vs) of the AC power source (30) is lower than a no-load induced electromotive force, a predetermined power can be supplied to the motor (20), and the motor (20) can be driven without always actively performing the flux-weakening control.

Further, in a fifth aspect, which is an embodiment of any one of the first to fourth aspects, the boost chopper controller (16) may operate the boost chopper (15) while a voltage (vs) of the AC power source (30) is lower than a predetermined value.

In this configuration, the switching element (15a) is provided with an idle period where the switching element (15a) is not operating and through which loss can be reduced.

Further, in a sixth aspect, which is an embodiment of any one of the first to fifth aspects, the boost chopper controller (16) may stop the operation of the boost chopper (15) when, during the operation of the boost chopper (15), a time product of a current input into the boost chopper (15) has exceeded a predetermined threshold value.

In this configuration, the switching element (15a) is provided with the idle period where the switching element (15a) is not operating.

Advantages of the Invention

According to the first aspect, power can be supplied to the motor without the current being largely increased due to the flux-weakening control. This can increase the efficiency of the electric power conversion device and the motor.

According to the second aspect, power can be efficiently supplied to the motor even in a case where the capacitor voltage (vdc) is at a lower limit. This can increase the efficiency of the electric power conversion device and the motor.

According to the third aspect, loss due to switching of the switching element (15a) can be reduced in a period where the absolute value of the voltage of the AC power source is relatively high.

According to the fourth aspect, the lower limit of the capacitor voltage (vdc) is altered based on the inductive voltage. This can significantly increase the efficiency.

According to the fifth aspect, apart from reducing the loss due to the switching of the switching element (15a), the capacitance of the switching element (15a) can be reduced.

According to the sixth aspect, apart from reducing the loss due to the switching of the switching element (15a), the capacitance of the switching element (15a) can be reduced even more reliably.

DESCRIPTION OF EMBODIMENT

Embodiments of the present invention will be described in detail with reference to the drawings. The foregoing embodiments are merely beneficial examples in nature, and are not intended to limit the scope, application, or uses of the present invention.

First Embodiment of Invention

Figure 1:
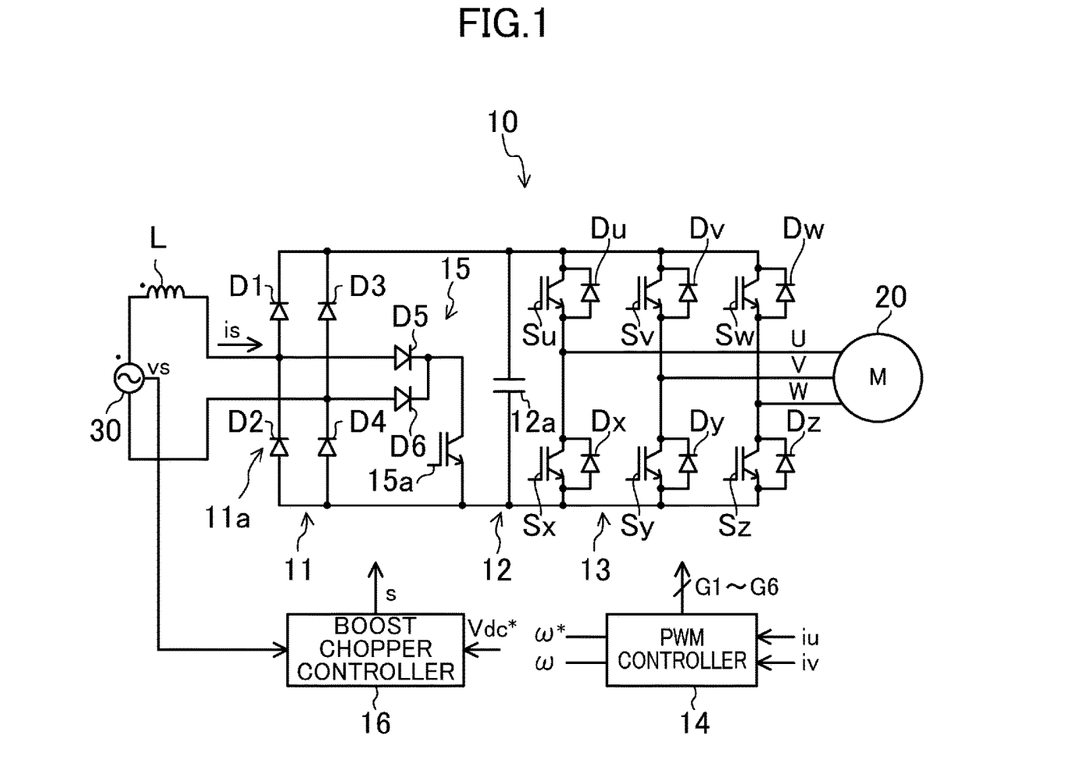
FIG. 1 is a block diagram showing a configuration of an electric power conversion device according to a first embodiment.

FIG. 1 is a block diagram showing a configuration of an electric power conversion device (10) according to a first embodiment of the present invention. The electric power conversion device (10) is used to supply power to, for example, a motor which drives a compressor of an air conditioner (not shown in the figures).

As shown in FIG. 1, the electric power conversion device (10) includes: a converter circuit (11) including a boost chopper (15); a DC link section (12); an inverter circuit (13); a PWM controller (14); and a boost chopper controller (16). The electric power conversion device (10) converts AC power supplied from a single-phase AC power source (30) into AC power of a predetermined frequency, and supplies the AC power to a motor (20). As the motor (20), for example a so-called IPM (interior permanent magnet) motor can be employed.

‹Converter Circuit›

In the present embodiment, the converter circuit (11) includes a full-wave rectifying circuit (11a) and the boost chopper (15).

The full-wave rectifying circuit (11a) is connected to the AC power source (30) via a reactor (L), which will be described later, and rectifies an AC from the AC power source (30) to a DC. In this example, the full-wave rectifying circuit (11a) acts as both a single-phase rectifier circuit as well as a diode bridge circuit, in which four diodes (D1 to D4) are connected in a bridge-like manner. The diodes (D1 to D4) full-wave rectify an AC voltage of the AC power source (30), and convert the AC voltage into DC voltage.

The boost chopper (15) includes the reactor (L), a diode (D5), a diode (D6), and a switching element (15a). In the boost chopper (15), the switching element (15a) switches the reactor (L) between energy storage and energy discharge. This boosts a capacitor voltage (vdc), which will be described later.

In this example, the diode (D5) has an anode, which is connected to a midpoint between the diodes (D1) and (D2), and a cathode, which is connected to a controlled terminal at a current-receiving side of the switching element (15a). Further, the diode (D6) has an anode, which is connected to a midpoint between the diodes (D3) and (D4), and a cathode, which is connected to the controlled terminal at the current-receiving side of the switching element (15a).

Moreover, the controlled terminal at the current-receiving side of the switching element (15a) is connected to a DC bus at a negative side of the full-wave rectifying circuit (11a). Switching of the switching element (15a) is controlled by the boost chopper controller (16).

‹ DC Link Section ›

The DC link section (12) includes a capacitor (12a). The capacitor (12a) is connected between output nodes of the converter circuit (11), and applies a terminal voltage (vdc) (hereinafter referred to as "capacitor voltage (vdc)") generated across the capacitor (12a) to an input node of the inverter circuit (13).

The capacitor (12a) has an electrostatic capacitance, which can only smooth a ripple voltage (voltage fluctuation) generated when a switching element (which will be described later) of the inverter circuit (13) performs a switching operation. In other words, the capacitor (12a) has a low capacitance and does not have an electrostatic capacitance which can smooth a voltage rectified by the converter circuit (11).

Figure 2:
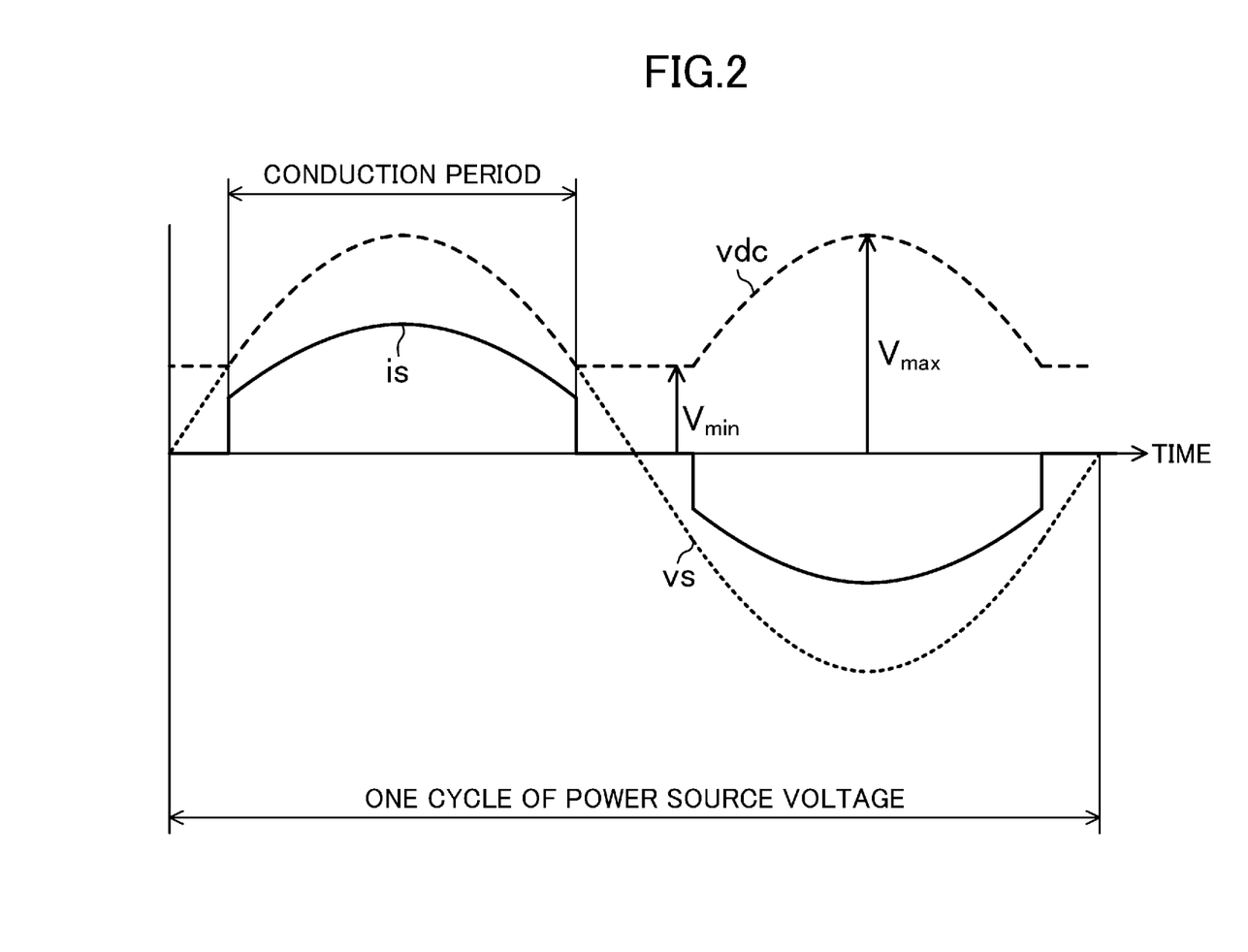
FIG. 2 exemplifies waveforms of a power source current (is), a power source voltage (vs), and a capacitor voltage (vdc).

FIG. 2 exemplifies waveforms of the current (hereinafter referred to as "power source current (is)") from the AC power source (30), the voltage (hereinafter referred to as "power source voltage (vs)") of the AC power source (30), and a waveform of the capacitor voltage (vdc). In FIG. 2, the waveforms of the capacitor voltage (vdc) and the power source current (is) are hypothetic waveforms in a case where the boost chopper (15) does no operate (or does not exist). In this example, the capacitor (12a) has a capacitance which allows the capacitor voltage (vdc) to have a pulse frequency twice as high as the frequency of the AC power source. When the boost chopper (15) is not operating, the capacitor voltage (vdc) has a pulse frequency twice as high as the frequency of the power source voltage (vs). Specifically, the capacitor voltage (vdc) has a strong pulse such that a maximum value ($V_{max}$) of the capacitor voltage (vdc) is twice as high as a minimum value ($V_{min}$) of the capacitor voltage (vdc).

‹ Inverter Circuit ›

The input node of the inverter circuit (13) is connected to the capacitor (12a) and is supplied with the capacitor voltage (vdc), which is pulsating. The inverter circuit (13), which is a so-called multiphase inverter circuit, converts the output of the DC link section (12) by switching into three-phase AC (U, V, W), and supplies the three-phase AC (U, V, W) to the motor (20).

The inverter circuit (13) of the present embodiment includes six switching elements (Su, Sv, Sw, Sx, Sy, Sz) in order to output the three-phase AC (U, V, W) to the motor (20). More specifically, the inverter circuit (13) includes three switching legs in each of which two of the switching elements are connected to each other in series. In each of the switching legs, midpoints of the upper-arm switching elements (Su, Sv, Sw) and the lower-arm switching elements (Sx, Sy, Sz) are connected to a load (here, the motor (20)). Each of the switching elements (Su, Sv, Sw, Sx, Sy, Sz) is connected to a freewheeling diode (Du, Dv, Dw, Dx, Dy, Dz) in antiparallel with each other.

Through an on/off operation of these switching elements (Su, Sv, Sw, Sx, Sy, Sz), the inverter circuit (13) converts the capacitor voltage (vdc) by switching into three-phase AC voltage and supplies the three-phase AC voltage to the motor (20). The PWM controller (14) controls the on/off operation.

Note that, in a power converter with a low capacitor capacitance, even if the boost chopper can boost the power source voltage (vs), this does not contribute to an improvement of a waveform of the power source current (is). The improvement of the waveform of the power source current (is) needs to be performed in a multiphase inverter. For example, a power factor and a current waveform of the AC power source can be improved by altering the output power of the multiphase inverter circuit (13) in synchronization with a power source. Specifically, an operation can be employed where the conduction width of a converter is widened by altering the output power or the motor torque at a frequency twice as high as that of the power source. Alternatively, an operation can be employed where the harmonics of the power source are controlled with an even higher accuracy by altering the output power or the motor torque at a frequency multiple times higher than that of the power source.

‹ PWM Controller ›

The PWM controller (14) includes a microcomputer (not shown in the drawings) and a memory device in which a program, which operates the microcomputer, is stored. The PWM controller (14) controls driving of the motor (20) by controlling the output of the inverter circuit (13). The driving of the motor (20) is controlled by, for example, vector control. In this example, a rotation speed (ω) of the motor (20) and a command value (ω*) of the rotation speed are input into the PWM controller (14). When the vector control is performed, the PWM controller (14) determines when each of the switching elements (Su, Sv, Sw, Sx, Sy, Sz) are to be turned on, and generates gate signals (G1, G2, ..., G6) which activate the switching elements such that the torque of the motor (20) has a pulse synchronous with the power source.

‹ Boost Chopper Controller ›

The boost chopper controller (16) includes a microcomputer (not shown in the drawings) and a memory device in which a program for operating the microcomputer is stored. The microcomputer of the boost chopper controller (16) may be the same as, or separate from, the microcomputer of the PWM controller (14). Information regarding the power source voltage (vs) and other information is input into the boost chopper controller (16). Based on this information, the boost chopper controller (16) generates a signal (a gate signal (S)) which activates the switching element (15a).

‹ Operation of Electric Power Conversion Device ›

In the present embodiment, the boost chopper controller (16) controls the switching of the boost chopper (15) (activation/deactivation of the switching and control of a duty cycle (D)). By this, the boost chopper controller (16) boosts the capacitor voltage (vdc) such that a lower limit of the input voltage (i.e., the capacitor voltage (vdc)) input into the inverter circuit (13) becomes equal to or higher than a predetermined target value. As a result, the PWM controller (14) may keep the flux weakening control to a minimum with respect to the motor (20). In flux-weakening control, a current is necessary to weaken a magnetic flux. The lower the capacitor voltage (vdc) is, the stronger a current is needed. The boost chopper controller (16) of the present embodiment detects a d-axis voltage (vd) and a q-axis voltage (vq) of the motor (20) (e.g., by obtaining information from the PWM controller (14)), and performs switching control of the boost chopper (15) based on the values detected.

Then, the boost chopper controller (16) controls the boost chopper (15) such that the boost chopper (15) operates only during part of the time of each half-cycle of the power source voltage (vs), and such that the capacitor voltage (vdc) is lower while the boost chopper (15) is operating than while the boost chopper (15) is not operating. That is, there are two kinds of periods during one cycle of the power source voltage (vs): an operating period, where the boost chopper (15) performs switching, and an idle period, where the boost chopper (15) does not perform switching.

Figure 3:
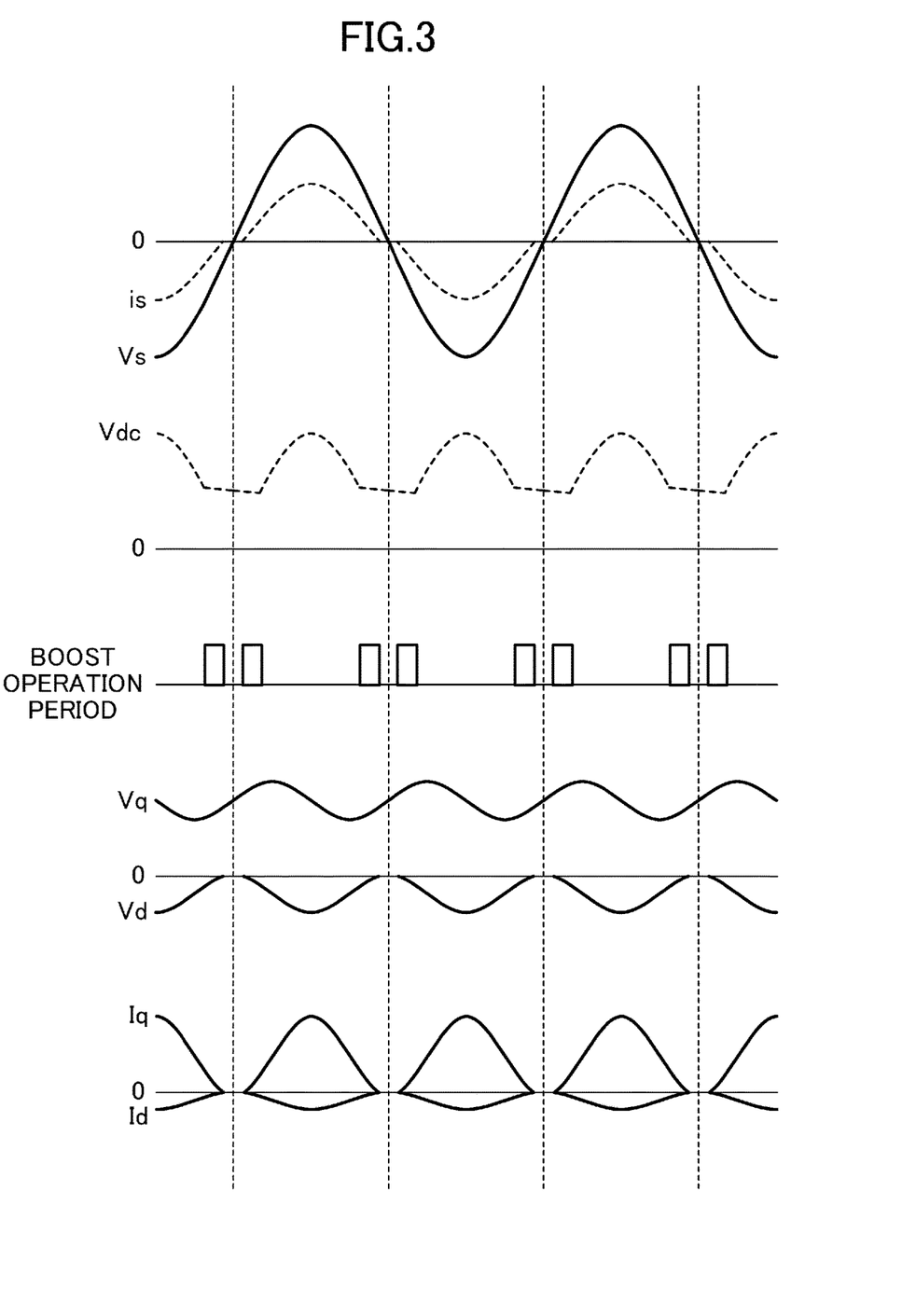
FIG. 3 exemplifies a switching condition of a boost chopper according to the first embodiment.

FIG. 3 exemplifies a switching condition of the boost chopper (15) according to the first embodiment. As shown in FIG. 3, in this example, the boost chopper controller (16) allows the boost chopper (15) to operate (switch) in a period where the capacitor voltage (vdc) is relatively low. As a result, in this example, the boost chopper (15) is operating in a predetermined period before and after the zero-crossing point of the power source voltage (vs) (i.e., this period does not include the zero-crossing point). The boost chopper controller (16) of the present embodiment determines a time product of a current input into the boost chopper (15) while the boost chopper (15) is operating. If the time product exceeds a predetermined threshold value, the boost chopper controller (16) stops the switching of the boost chopper (15). Limiting the operating period of the boost chopper (15) can reduce a switching loss occurring in the boost chopper (15). Further, the capacitance of the switching element (15a) can be reduced (i.e., the switching element (15a) can be miniaturized).

Note that, when the time product is determined, various current values can be detected. For example, the current can be detected when flowing through the switching element (15a) of the boost chopper (15), or a current value can be detected in a shunt resistor provided for the inverter circuit (13). In short, a current value can be detected anywhere in the circuit as long as the current value correlates with the current input into the boost chopper (15). Moreover, determining the time product does not mean simply determining the time product of the values detected. Taking the thermal resistance of the switching element (15a) into consideration, the time product is determined based on a value obtained by passing the respective current value through a low-pass filter. The value determined and the threshold value can be compared to each other.

Advantages of First Embodiment

As can be seen, in the present embodiment, the boost chopper (15) boosts the capacitor voltage (vdc) before the capacitor voltage (vdc) becomes insufficient for the required d-axis voltage (vd) and q-axis voltage (vq). Therefore, in the present embodiment, the so-called flux-weakening control is performed less frequently. While widening the conduction width, system efficiency of the electric power conversion device and the motor can be improved.

Note that it is beneficial if the target value of the lower limit of the capacitor voltage (vdc) is dynamically altered based on the inductive voltage of the motor (20). Specifically, in a case where the inductive voltage of the motor (20) has increased, it is beneficial to boost the target value. If the inductive voltage has decreased, it is beneficial to decrease the target value. Thus, the system efficiency may be expected to significantly improve even more.

Second Embodiment of Invention

In a second embodiment of the present invention, a different kind of control of the boost chopper (15) is exemplified. The boost chopper controller (16) of the present embodiment allows the switching element (15a) to switch only during part of the time (hereinafter referred to as "on/off operation period;" see FIG. 2) of each half-cycle of the power source voltage (vs), including the zero-crossing point of the power source voltage (vs). During the rest of the time (hereinafter referred to as "idle period"), the boost chopper controller (16) stops the switching of the switching element (15a).

During the on/off operation period, the absolute value of the power source voltage (vs) is lower than a command value (vdc*) of the capacitor voltage (vdc). Here, it is beneficial to set the command value (vdc*) within a range that improves the efficiency of the system. For example, the command value (vdc*) may be set higher than the induced electromotive force of the motor (20). In other words, during the on/off operation period, the absolute value of the voltage (vs) is lower than the predetermined command value (vdc*), which has been set higher than the induced electromotive force of the motor (20).

Note that, if the on/off operation period is a period where a value obtained by considering a voltage drop of the reactor with respect to the absolute value of the power source voltage (vs) is lower than the predetermined command value (vdc*), the capacitor voltage can be brought close to the command value even more precisely.

Further, the boost chopper controller (16) determines a duty cycle (D) of the switching (repetition of an on/off operation) during the on/off operation period by the following equation (1).

$$D=1-\{|vs|-L\times(dis/dt)\}/vdc^* \quad (0 \leq D \leq 1) \qquad \text{Equation (1)}$$

Moreover, after having determined the duty cycle (D), the boost chopper controller (16) determines a pulse width of a gate signal (S) by the following equation (2).

$$t_{on}=D\times Tc \qquad \text{Equation (2)}$$

In Equation (2), Tc is a predetermined switching cycle.

After having determined $t_{on}$ this way, the boost chopper controller (16) generates a gate signal (S) where the pulse width is ton, and outputs the gate signal (S) to the switching element (15a). Note that this method for determining the duty cycle (D) is only an example. Various other methods may be used as well. In short, it is beneficial if the on/off operation of the switching element (15a) is controlled such that the capacitor voltage acts as the command voltage.

‹ Operation of Electric Power Conversion Device ›

In the electric power conversion device (10), the DC output by the converter circuit (11) is converted by the inverter circuit (13) into the AC, and supplied to the motor (20). Then the inverter circuit (13) generates the gate signals (G1, G2, . . . , G6) by closed-loop control such that a difference between the rotation speed (ω) and the command value (ω*) of the rotation speed (ω) is reduced, and outputs the gate signals (G1, G2, . . . , G6) to the inverter circuit (13). During this voltage conversion, the boost chopper controller (16) controls the boost chopper (15).

First, the boost chopper controller (16) monitors information regarding the power source voltage (vs), and detects when the power source voltage (vs) reaches the zero-crossing point. In a predetermined period before and after the zero-crossing point, the absolute value of the power source voltage (vs) is lower than the command value (vdc*) of the capacitor voltage (vdc). By determining the zero-crossing point of the power source voltage (vs), the boost chopper controller (16) determines when the on/off operation period starts and ends (i.e., the boost chopper controller (16) also determines the idle period). Note that the method for detecting the zero-crossing point is not limited to this. Various methods may be employed.

—Idle Period—

Figure 4:
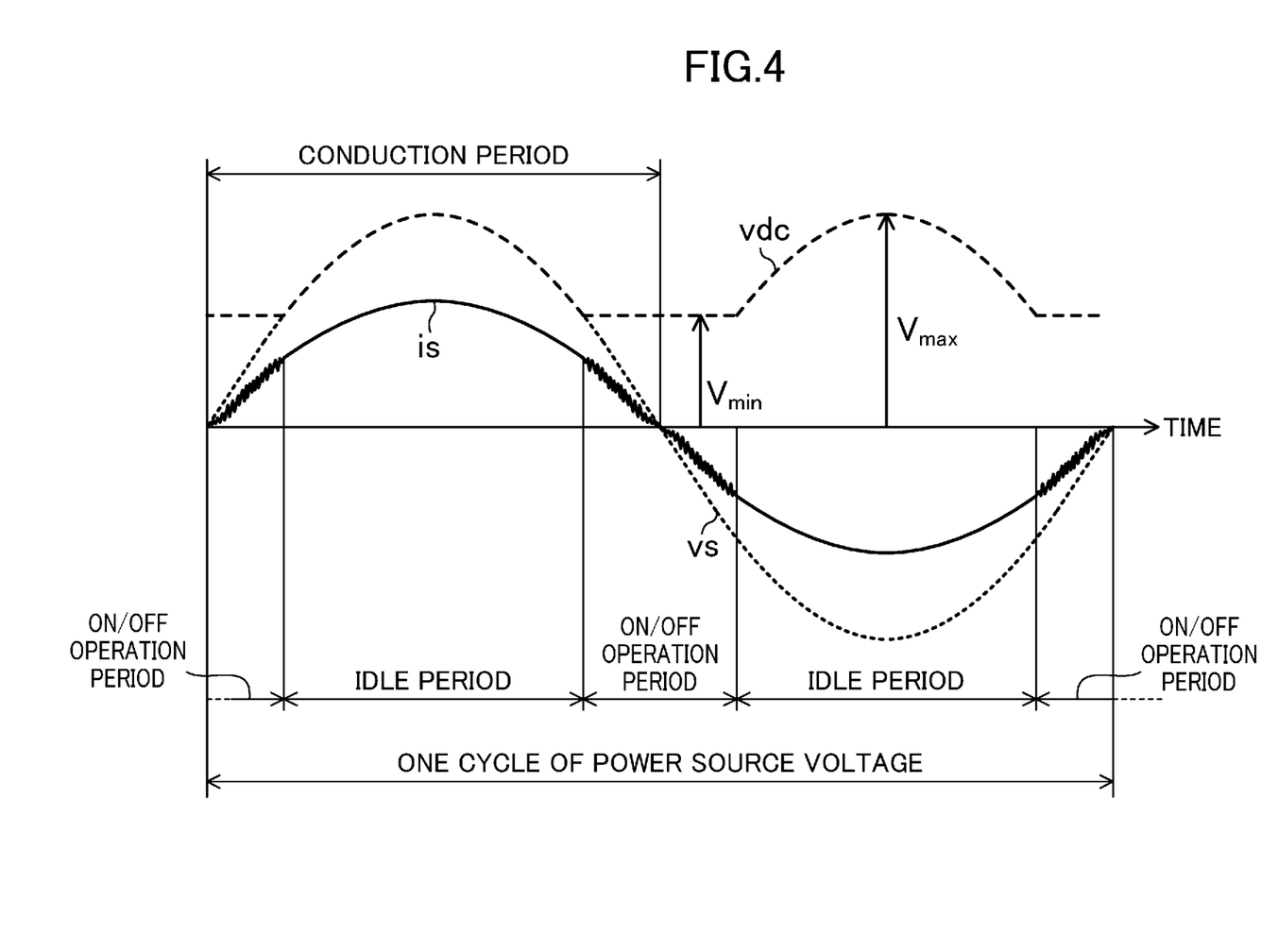
FIG. 4 schematically shows waveforms in an idle period and in an on/off operation period, and a waveform of the capacitor voltage (vdc).

FIG. 4 schematically shows waveforms in the idle period and in the on/off operation period, and a waveform of a capacitor voltage (vdc). During the idle period, the boost chopper controller (16) stops the on/off operation of the switching element (15a). This reduces loss due to the switching of the switching element (15a).

However, in an electric power conversion device which includes a large smoothing capacitor, such as an electrolytic capacitor, which is located between an converter circuit and an inverter circuit, and in which a DC of a very low pulse is supplied to the inverter circuit (hereinafter referred to as a "conventional electric power conversion device"), a rectifier diode conducts current only in a period where an absolute value of a power source voltage is higher than a voltage of the smoothing capacitor. Therefore, in the conventional electric power conversion device, the waveform of the current develops spikes, which negatively affects the power factor and results in the current including a harmonic component.

In the electric power conversion device (10), by contrast, the capacitor voltage (vdc) has a pulse. Therefore, the conduction period of each of the diodes (D1 to D4) of the full-wave rectifying circuit (11a) is longer than in the conventional electric power conversion device. A longer conduction period of the diodes (D1 to D4) used for rectification can improve the power factor. This effect can be utilized during the idle period. Moreover, the power source current (is) has a waveform close to a sine wave. That is, during the idle period, the harmonic component included in the power source current (is) decreases.

—On/Off Operation Period—

On the other hand, during the on/off operation period, the boost chopper controller (16) allows the switching element (15a) of the boost chopper (15) to perform the on/off operation. When the switching device (15a) performs the switching, the reactor (L) stores and discharges energy. At this time, the power source current (is) is allowed to obtain a waveform close to a sine wave by appropriately setting the duty cycle (D) of the gate signal (S), as described above. This allows for improving power factor efficiency and for reducing the harmonic component of the power source current (is) in the electric power conversion device (10), even during the on/off operation period.

Further, during the on/off operation period, the absolute value of the power source voltage (vs) is lower than the command value (vdc*) of the capacitor voltage (vdc). Therefore, if—hypothetically—the full-wave rectifying circuit (11a) rectifies the pulse of the power source voltage (vs) as it is, there is a possibility that the capacitor voltage (vdc) develops a pulse in accordance with the pulse of the power source voltage (vs) and becomes lower than the induced electromotive force of the motor (20).

In the present embodiment, however, the power source voltage is boosted by the operation of the boost chopper (15). By this, the capacitor voltage (vdc) can be kept from becoming lower than the capacitor voltage (vdc*). As described above, the command value (vdc*) is set higher than the induced electromotive force of the motor (20). Consequently, even if the capacitor voltage (vdc) has a pulse, a desired torque can be generated without performing the flux-weakening control of the motor (20), which is connected to the inverter circuit (13).

During the on/off operation period, the switching device (15a) performs the switching, which is why loss occurs due to the switching. In this period, however, the loss occurs only during part of the time of one cycle of the power source voltage (vs). Consequently, when considering the entire operating period of the electric power conversion device (10), loss is decreased.

Figure 5:
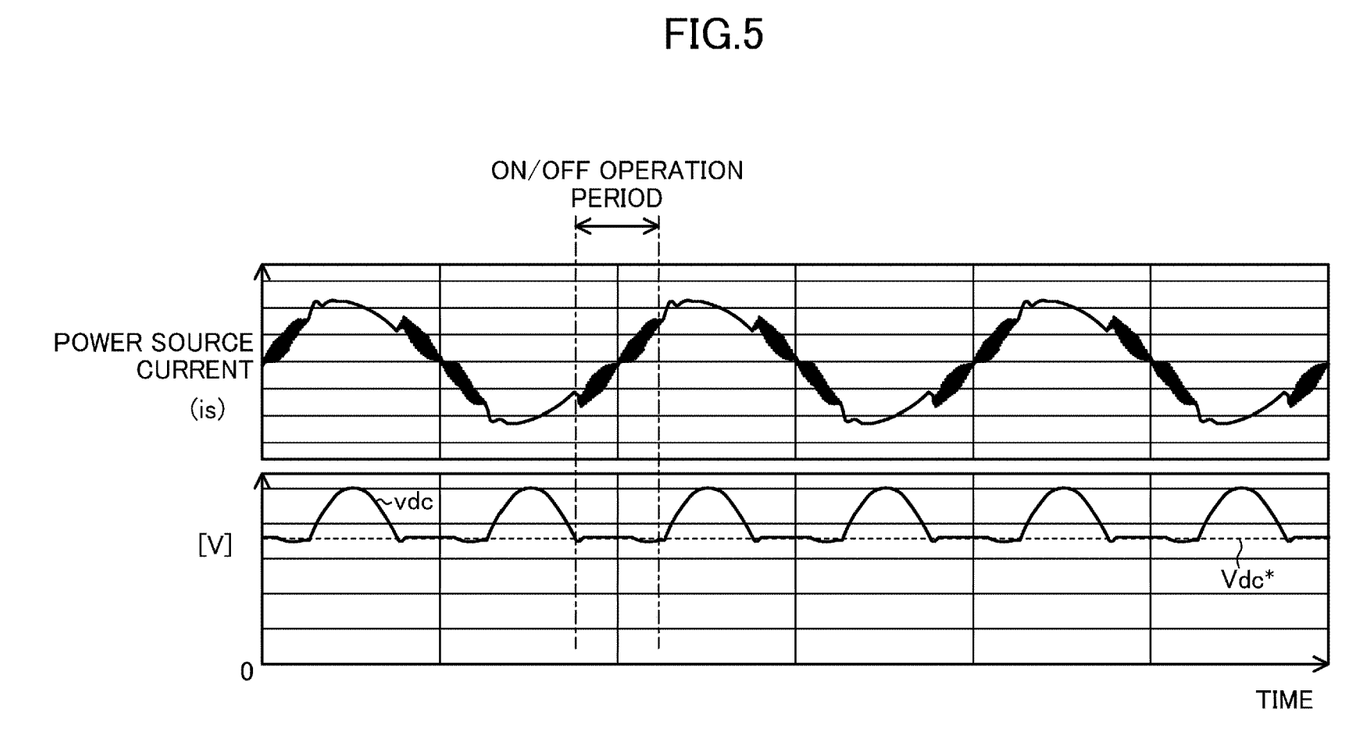
FIG. 5 exemplifies waveforms of the power source current (is) and the capacitor voltage (vdc), and a command value (vdc*) of the capacitor voltage.

FIG. 5 exemplifies the waveforms of the power source current (is) and the capacitor voltage (vdc), and a command value (vdc*) of the capacitor voltage (vdc). As shown in FIG. 5, during the on/off operation period, the conduction period of the power source current (is) is expanded to the zero-crossing point. Further, during the idle period, the waveform of the power source current (is) is controlled to a sine wave by the effect of having employed a capacitor of a small capacitance as the capacitor (12a) of the DC link section (12). Note that an operation range (on/off operation period) of the boost chopper (15) widens as the command value (vdc*) increases, and narrows as the command value (vdc*) decreases.

Setting the command value (vdc*) to a value, which allows the inverter circuit (13) to output a voltage corresponding to the no-load induced electromotive force of the motor (20), makes operation with a reduced system loss possible.

Figure 6:
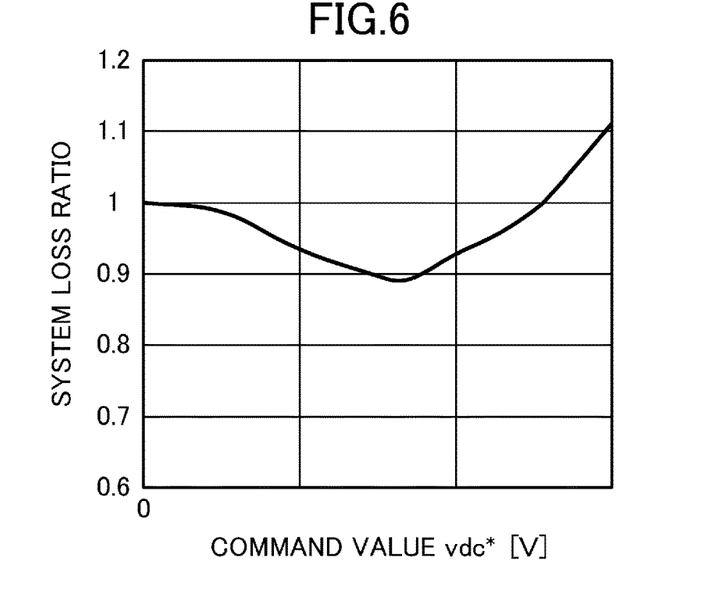
FIG. 6 shows a relationship between loss, which is an integrated loss combining loss of the electric power conversion device and copper loss in a motor, and the command value (vdc*).

FIG. 6 shows a relationship between the loss, which is an integrated loss combining the loss of the electric power conversion device (10) and copper loss in a motor (20), and the command value (vdc*). On the y-axis in FIG. 6, the loss in a case where the command value (vdc*) is 0 V is a ratio (for the sake of explanation referred to as "system loss ratio") set to the value "1." As shown in FIG. 6, at a certain command value (vdc*) the system loss ratio reaches a minimum. This is due to the existence of various loss factors, which increase or reduce the system loss ratio depending on the command value (vdc*). Factors which increase the system loss ratio include a prolongation of the on/off operation period along with an increase of the command value (vdc*). The increase of the on/off operation period increases the loss due to the operation of the boost chopper (15). Factors which decrease the system loss ratio along with an increase of the command value (vdc*) include the flux-weakening control of the motor (20) performed when the command value (vdc*) has been reduced. In flux-weakening control, a current is necessary to weaken a magnetic flux. The lower the capacitor voltage (vdc) is, the stronger a current is needed. Consequently, the copper loss of the motor (20) decreases as the current of the motor (20), which is required for the flux-weakening control, decreases along with the increase of the command value (vdc*). By setting the command value (vdc*) to a value which allows the inverter circuit (13) to output a voltage corresponding to the no-load induced electromotive force of the motor (20), the copper loss of the motor (20), which abruptly increases due to the flux-weakening control, can be decreased to a minimum. Thus, the entire system can be operated with high efficiency.

Note that a minimum capacitor voltage (vdc) necessary to allow the inverter circuit (13) to output a voltage corresponding to the no-load induced electromotive force of the motor (20) varies according to a modulation scheme. In sinusoidal modulation, which does not employ over-modulation, the effective value of a line-to-line fundamental voltage of an inverter output reaches a maximum DC voltage (i.e., vdc) of $1/\sqrt{2}$. Therefore, a capacitor voltage (vdc) needs to be set to a value approximately 1.41 times the effective value of the fundamental component of the no-load induced electromotive force generated as line-to-line voltage across motor terminals. In control by a three-phase inverter with a six-step waveform, which can increase the effective value of the line-to-line fundamental voltage of the inverter output to a maximum, it is beneficial if the capacitor voltage (vdc) is 1.28 times the effective value of the fundamental component of the no-load induced electromotive force. Consequently, also the command value (vdc*) varies according to the modulation scheme.

Figure 7:
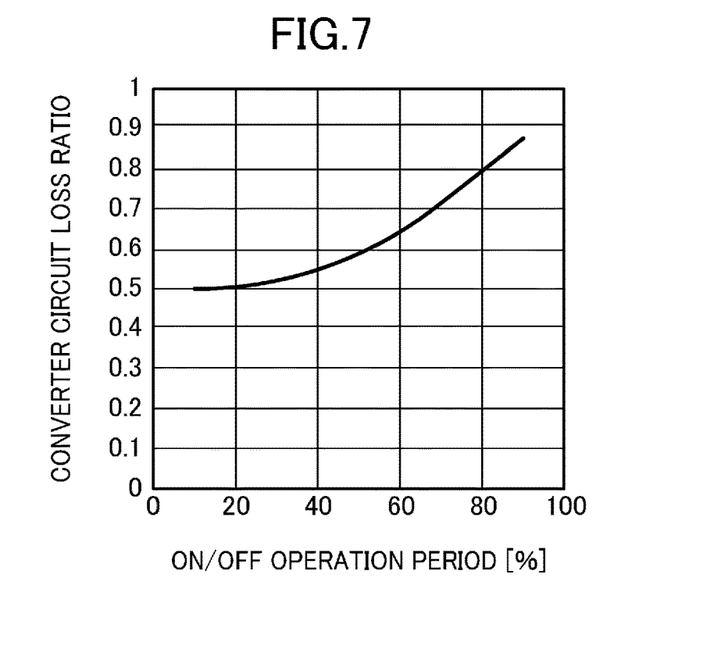
FIG. 7 shows a relationship between a loss ratio and the on/off operation period of a converter circuit.

FIG. 7 shows the relation between the loss ratio of the converter circuit (11) and the on/off operation period. On the x-axis in FIG. 7, the on/off operation period is shown as a ratio with respect to one cycle of the power source voltage (vs). Further, during one entire cycle of the power source voltage (vs), the loss ratio of the converter circuit (11) is a ratio where the loss is set to the value "1" in a case where switching is performed in the boost chopper (15). This loss includes all so-called "on-losses" and switching losses of the diode (D5), the diode (D6), and the switching device (15a).

As shown in FIG. 7, when the switching is performed when the on/off operation is 10%, that is in a range of 5% above or below the zero-crossing point, the loss can be decreased by about half. Further, when the on/off operation period is set to 50%, the loss can be decreased by approximately two fifths. If the on/off operation period is set to equal to or higher than 50%, the loss increases roughly proportionally to the intensity of the on/off operation period.

Advantages of Second Embodiment

As can be seen, the present embodiment allows for reducing an increase of the loss in the electric power conversion device (10) while improving the power factor and reducing harmonics.

Other Embodiments

Note that in the first and second embodiments, in a period where the absolute value of the power source voltage is high, the boost chopper is controlled to stop operating. However, this is not stringently required. In each half-cycle of the power source voltage (vs), the boost chopper controller (16) may control the boost chopper (15) to have an operating period and an idle period, and may control the minimum value of the absolute value of the power source voltage (vs) during the operating period of the boost chopper (15) to be lower than the maximum value of the absolute value of the power source voltage (vs) during the idle period.

Alternatively, the boost chopper (15) may as well perform the switching during the entire time without being provided with the idle period. In short, a predetermined effect can be achieved by boosting the lower limit of the capacitor voltage (vdc) to become equal to or higher than a predetermined target value.

Figure 8:
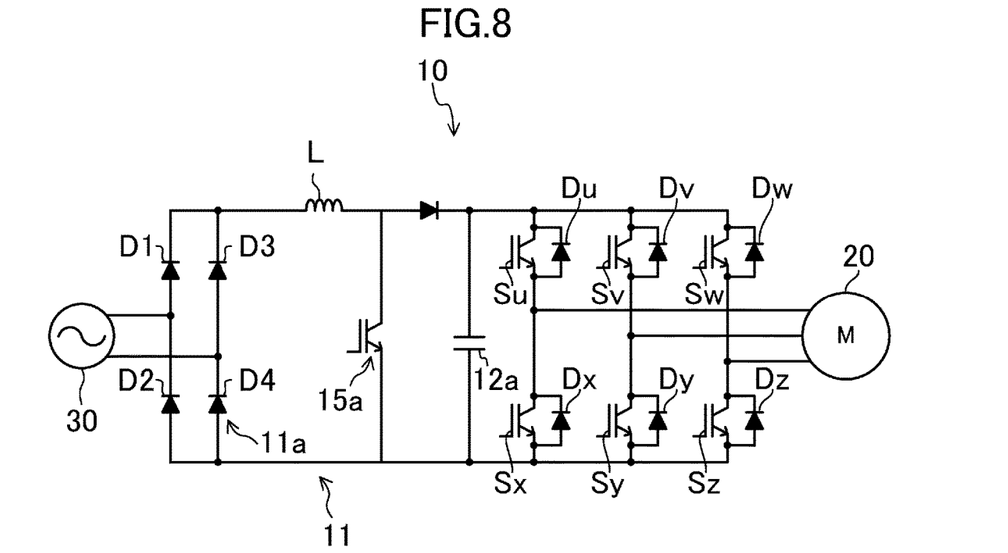
FIG. 8 shows a variation of the configuration of the electric power conversion device according to the first embodiment.

Moreover, the control methods of the first and second embodiments may be employed for an electric power conversion device which includes a converter circuit, in which a boost chopper is connected to an output terminal of a full-wave rectifying circuit (see FIG. 8). In short, a predetermined effect can be achieved as long as the control method is employed in a converter circuit which includes a boost function.

INDUSTRIAL APPLICABILITY

The present invention is useful for an electric power conversion device.

DESCRIPTION OF REFERENCE CHARACTERS

10 Electric Power Conversion Device
11 Converter Circuit
12 DC Link Section
12a Capacitor
13 Inverter Circuit (Multiphase Inverter Circuit)
15a Switching Element
16 Boost Chopper Controller
20 Motor
30 AC Power Source

The invention claimed is:

1. An electric power conversion device comprising:
a converter circuit, which is connected to an AC power source and includes a boost chopper;
a capacitor, which is connected between output terminals of the converter circuit;
a multiphase inverter circuit, which converts a terminal voltage of the capacitor into a multi-phase AC voltage and outputs power to a motor; and
a boost chopper controller, which controls operation of the boost chopper, wherein
the capacitor has a capacitance allowing the terminal voltage of the capacitor to have a pulse frequency twice as high as a frequency of the AC power source when the operation of the boost chopper is continuously stopped, and
the multiphase inverter circuit includes
switching elements connected as multiple switching legs, the number of switching legs corresponding to the number of phases of the multi-phase AC voltage, each switching leg including a pair of the switching elements connected in series;
a pulse width modulation (PWM) controller that performs control of respective ON/OFF states of the switching elements, at a frequency at least twice as the frequency of the AC power source, so that the output power has a pulse frequency in synchronization with the frequency twice as high as the frequency of the AC power source.

2. The electric power conversion device of claim 1, wherein
the boost chopper controller boosts a lower limit of a terminal voltage of the capacitor to a value equal to or higher than a predetermined target value.

3. The electric power conversion device of claim 1, wherein
the boost chopper controller provides the boost chopper with an operating period and an idle period in each half cycle of a voltage of the AC power source, and controls the boost chopper such that a minimum value of an absolute value of the voltage of the AC power source in the operating period of the boost chopper is lower than a maximum value of an absolute value of the voltage of the AC power source in the idle period of the boost chopper.

4. The electric power conversion device of claim 2, wherein
the boost chopper controller boosts the target value when an inductive voltage of the motor has increased.

5. The electric power conversion device of claim 1, wherein
the boost chopper controller operates the boost chopper while a voltage of the AC power source is lower than a predetermined value.

6. The electric power conversion device of claim 1, wherein
the boost chopper controller stops the operation of the boost chopper when, during the operation of the boost chopper, integration of current over time input into the boost chopper has exceeded a predetermined threshold value.

7. The electric power conversion device of claim 2, wherein
the boost chopper controller provides the boost chopper with an operating period and an idle period in each half cycle of a voltage of the AC power source, and controls the boost chopper such that a minimum value of an absolute value of the voltage of the AC power source in the operating period of the boost chopper is lower than a maximum value of an absolute value of the voltage of the AC power source in the idle period of the boost chopper.

8. The electric power conversion device of claim 2, wherein
the boost chopper controller operates the boost chopper while a voltage of the AC power source is lower than a predetermined value.

9. The electric power conversion device of claim 3, wherein
the boost chopper controller operates the boost chopper while a voltage of the AC power source is lower than a predetermined value.

10. The electric power conversion device of claim 4, wherein
the boost chopper controller operates the boost chopper while a voltage of the AC power source is lower than a predetermined value.

11. The electric power conversion device of claim 7, wherein
the boost chopper controller operates the boost chopper while the voltage of the AC power source is lower than a predetermined value.

12. The electric power conversion device of claim 2, wherein
the boost chopper controller stops the operation of the boost chopper when, during the operation of the boost chopper, integration of current over time input into the boost chopper has exceeded a predetermined threshold value.

13. The electric power conversion device of claim 3, wherein
the boost chopper controller stops the operation of the boost chopper when, during the operation of the boost chopper, integration of current over time input into the boost chopper has exceeded a predetermined threshold value.

14. The electric power conversion device of claim 4, wherein
the boost chopper controller stops the operation of the boost chopper when, during the operation of the boost chopper, integration of current over time input into the boost chopper has exceeded a predetermined threshold value.

15. The electric power conversion device of claim 5, wherein
the boost chopper controller stops the operation of the boost chopper when, during the operation of the boost chopper, integration of current over time input into the boost chopper has exceeded a predetermined threshold value.

16. The electric power conversion device of claim 7, wherein
the boost chopper controller stops the operation of the boost chopper when, during the operation of the boost chopper, integration of current over time input into the boost chopper has exceeded a predetermined threshold value.

17. The electric power conversion device of claim 8, wherein
the boost chopper controller stops the operation of the boost chopper when, during the operation of the boost chopper, integration of current over time input into the boost chopper has exceeded a predetermined threshold value.

18. The electric power conversion device of claim 9, wherein
the boost chopper controller stops the operation of the boost chopper when, during the operation of the boost chopper, integration of current over time input into the boost chopper has exceeded a predetermined threshold value.

19. The electric power conversion device of claim 10, wherein
the boost chopper controller stops the operation of the boost chopper when, during the operation of the boost chopper, integration of current over time input into the boost chopper has exceeded a predetermined threshold value.

20. The electric power conversion device of claim 11, wherein
the boost chopper controller stops the operation of the boost chopper when, during the operation of the boost chopper, integration of current over time input into the boost chopper has exceeded a predetermined threshold value.

* * * * *